United States Patent [19]

Fujii et al.

[11] Patent Number: 5,764,600
[45] Date of Patent: Jun. 9, 1998

[54] OVERWRITABLE, HIGH-DENSITY MAGNETO-OPTICAL RECORDING MEDIUM AND RECORDING/ REPRODUCTION METHOD THEREFOR

[75] Inventors: Yoshio Fujii; Tatsuya Fukami; Takashi Tokunaga; Yoshiyuki Nakaki; Kazuhiko Tsutsumi, all of Amagasaki, Japan

[73] Assignee: Mitsubishi Denki Kabushiki Kaisha, Tokyo, Japan

[21] Appl. No.: 464,371

[22] Filed: Jun. 5, 1995

Related U.S. Application Data

[62] Division of Ser. No. 107,157, Aug. 17, 1993, Pat. No. 5,449,566.

[30] Foreign Application Priority Data

Sep. 9, 1992 [JP] Japan ................... 4-240418
Apr. 12, 1993 [JP] Japan ................... 5-84528

[51] Int. Cl.$^6$ .................................................. G11B 5/66
[52] U.S. Cl. ............... 369/13; 369/272; 369/283; 369/286; 428/694 ML; 428/694 MM; 428/694 EC; 428/900
[58] Field of Search ............... 428/694 ML, 694 MM, 428/694 EC, 900; 369/13, 272, 283, 286

[56] References Cited

U.S. PATENT DOCUMENTS

| | | | |
|---|---|---|---|
| 4,882,231 | 11/1989 | Aratani | 428/611 |
| 4,908,809 | 3/1990 | Tadokoro et al. | 369/13 |
| 5,016,232 | 5/1991 | Tadokoro et al. | 369/13 |
| 5,164,926 | 11/1992 | Matsumoto | 369/13 |
| 5,449,566 | 9/1995 | Fuji | 428/694 EC |

FOREIGN PATENT DOCUMENTS

| | | |
|---|---|---|
| 0 258 978 | 3/1988 | European Pat. Off. . |
| 304873 | 3/1989 | European Pat. Off. . |
| 60-9855 | 1/1985 | Japan . |
| 165847 | 7/1986 | Japan . |

OTHER PUBLICATIONS

J. Saito et al., "Direct Overwrite by Light Power Modulation on Magneto–Optical Multi–Layered Media", *Japanese Journal of Applied Physics*, vol. 26, 1987, Supplement 26–4, pp. 155–159.

M. Kaneko et al., "Multilayered Magneto–Optical Disks for Magnetically Induced Superresolution", *Japanese Journal of Applied Physics*, vol. 31, 1992, Part 1, No. 2B, Feb. 1992, pp. 568–575.

*Japanese Journal of Applied Magnetics*, vol. 14, 1990, Part 12, pp. 165–170 Verified English translation of Japanese Patent Application No. 240418/1992.

Fujii et al., Extract of "Direct Overwriting and Super Resolution Readout by Exchange–Coupled Multilayer Film".

Fujii et al., "DOW and SR Readout by Exchange Coupled Multilayer Film", J. Mag. Soc. Jpn. vol. 17 (1993) pp. 167–170.

Nakada et al., "MO Properties of (Pr, Nd)–(Tb,Dy)–FeCo Amorphous Films" IEEE Trans. Mag. vol. 25, No. 5 (Sep. 1989) pp. 3767–3769.

*Primary Examiner*—Leszek Kiliman
*Attorney, Agent, or Firm*—Burns, Doane, Swecker & Mathis, LLP

[57] ABSTRACT

A recording/reproduction method for recording or reproducing information using the magneto-optical recording medium, the magneto-optical recording medium comprising a first magnetic layer comprising a rare earth-transition metal alloy or a ferromagnetic material containing a magnetic transition metal, a second magnetic layer comprising a rare earth-transition metal alloy, a third magnetic layer comprising a rare earth-transition metal alloy, a fourth magnetic layer comprising a rare earth-transition metal alloy, a fifth magnetic layer comprising a rare earth-transition metal alloy, and a sixth magnetic layer comprising a rare earth-transition metal alloy, the second to sixth magnetic layers being stacked in this order on the first magnetic layer, adjacent layers of the second to sixth magnetic layers being coupled by an exchange force thereof.

7 Claims, 8 Drawing Sheets

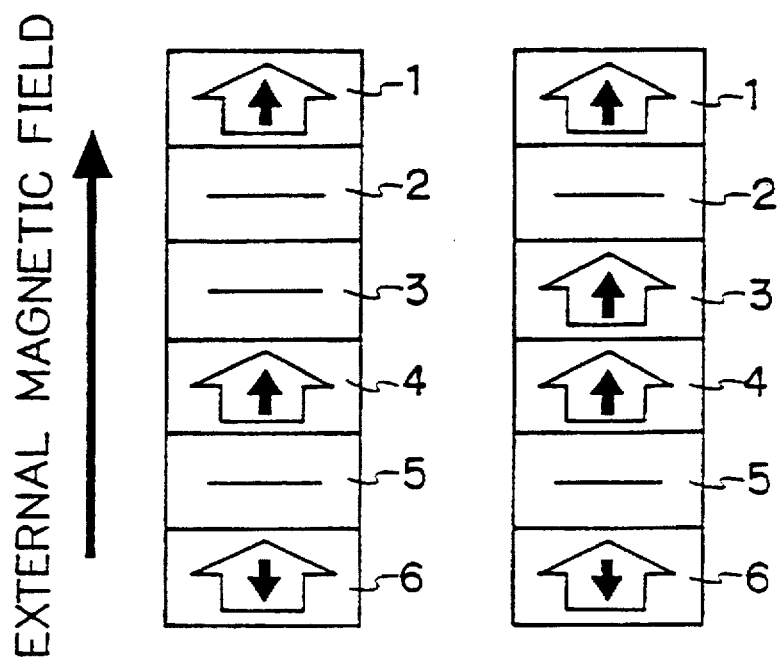
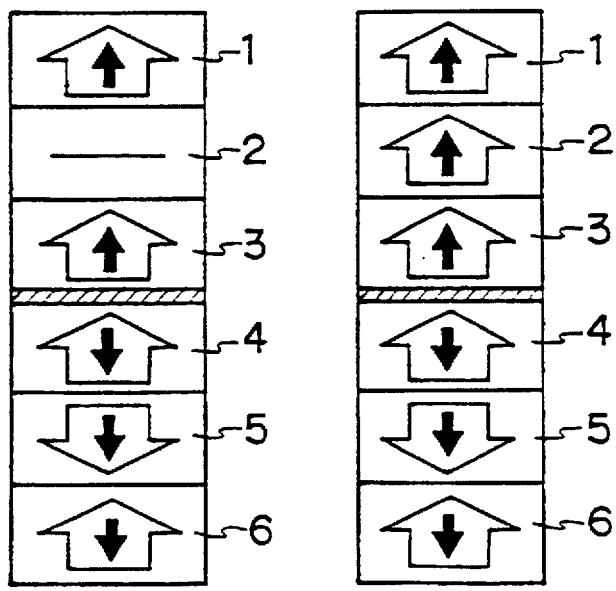

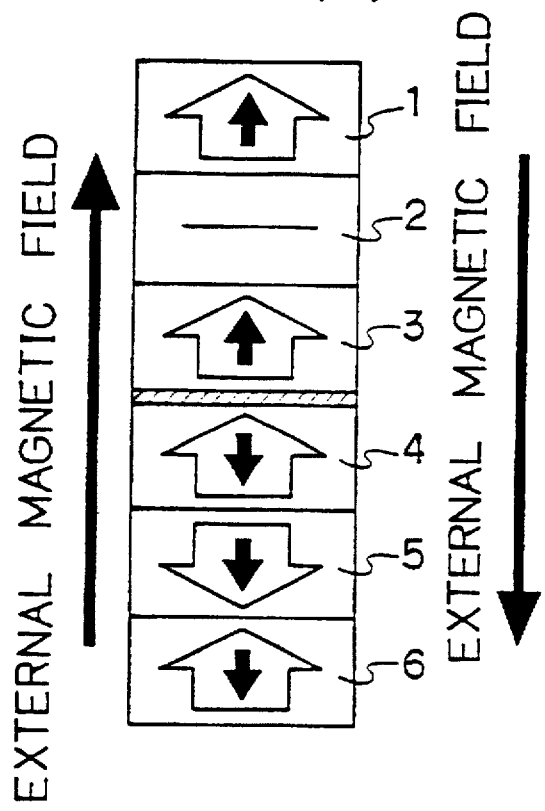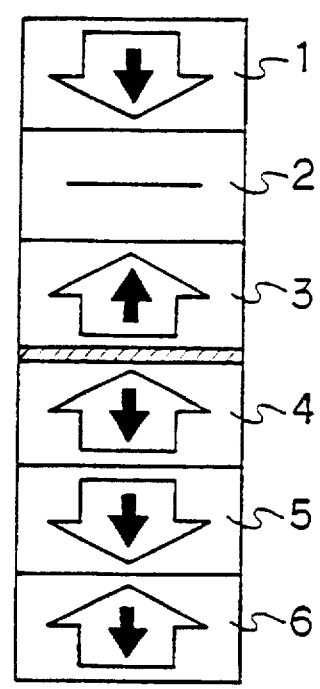

OVERWRITABLE, HIGH-DENSITY MAGNETO-OPTICAL RECORDING MEDIUM AND RECORDING/ REPRODUCTION METHOD THEREFOR

This application is a divisional of application Ser. No. 08/107,157, filed Aug. 17, 1993, now U.S. Pat. No. 5,449,566.

BACKGROUND OF THE INVENTION

The present invention relates to a magneto-optical recording medium which allows direct overwriting by light modulation and reproduction with superresolution (hereinafter referred to as "superresolutive reproduction"), and to a recording/reproduction method for this recording medium.

There have heretofore been known, as magneto-optical recording media, various magnetic films of rare earth-transition metal alloys, such as TbFeCo film. However, these conventional magneto-optical recording media involve problems such as a limited recording density because it is impossible to reproduce information recorded in a bit domain which is smaller than the optical resolving power of an optical system for reproduction, a low recording speed because direct overwriting is impossible, i.e., recording must be performed after erasure of previously recorded information.

There have recently been proposed a method of superresolutive reproduction to address the former problem and an exchange-coupled four-layers film allowing direct overwriting to address the latter.

The method of superresolutive reproduction is described in, for example, Japanese Journal of Applied Physics, Vol. 31, Part 1, No. 2B, February 1992, pp. 568–575. FIG. 7 is an explanatory view showing the layered structure of an magneto-optical recording medium allowing superresolutive reproduction, with indication of the magnetization direction of each layer by an arrow. The operation in the method of superresolutive reproduction will be described with reference to FIG. 7 wherein numeral 11 denotes a reproduction layer, numeral 12 denotes a switching layer, numeral 13 denotes a memory layer, numeral 14 denotes a mask region, numeral 15 denotes a light spot, numeral 16 denotes a record bit domain, and numeral 17 denotes an unrecorded region. The magnetization of the reproduction layer 11 is aligned in the same direction as that of the memory layer 13 at room temperature by exchange-coupling through the switching layer 12. When the magnetic layer is given the energy of reproduction light, a temperature distribution is produced of which peak appears on the medium-advancing side of the reproduction light spot. Within such a temperature distribution of the magnetic layer the portion of the switching layer 12 which is heated above the Curie temperature thereof cuts off the exchange-coupling between the reproduction layer 11 and the memory layer 13. Hence, the magnetization direction of the reproduction layer 11 at the region coincident with that portion of the switching layer 12 is no longer restrained by the memory layer 13 and is, therefore, aligned with the direction of an external magnetic field so as to be identical with each other. At this time that region of the reproduction layer 11 within the reproduction light spot, of which magnetization direction is aligned with the direction of the external magnetic field, becomes a mask region 14, which will not contribute to a reproductive signal component. Therefore, the reproductive signal is detected from the region other than the "mask" region. This means that the diameter of the light spot is virtually reduced. In other words, it is possible to achieve reproduction from a minute magnetic bit domain which is beyond the limit of an optical resolving power ruled by the diameter of a light spot. That is, superresolutive reproduction is feasible. To form the "mask" required for the superresolutive reproduction a reproduction light beam needs to have a certain degree of intensity. The intensity of a reproduction light beam for the superresolutive reproduction is represented by $P_R$ hereinbelow.

On the other hand, the exchange-coupled four layer film allowing direct overwriting is described in, for example, Japanese Journal of Applied Magnetics, Vol. 14, No. 2, 1990, pp. 165 to 170. FIG. 8 is an explanatory view for illustrating a direct overwriting operation of the aforesaid four layer magneto-optical memory medium allowing direct overwriting based only on modulation of light intensity. In FIG. 8, a large arrow indicates the magnetization direction of each layer, while a small arrow in the large arrow the magnetization direction of the transition metal sub-lattice of each layer. The four layer magnetic film includes, from the top, a memory layer 21, recording layer 22, switching layer 23 and an initializing layer 24. The Curie temperatures of the layers 21 to 24 are represented by $T_{c1}$, $T_{c2}$, $T_{c3}$ and $T_{c4}$) respectively. $T_{room}$ represents room temperature, $T_{comp2}$ the compensation temperature of the recording layer 22, and $T_{comp4}$ the compensation temperature of the initializing layer 24. The direct overwriting operation will be described in the order of (A) initializing operation, (B) high-temperature operation and (C) low-temperature operation.

In the initializing operation (A), after the formation of the magneto-optical recording medium, the respective transition metal sub-lattice magnetization directions of the recording layer 22, switching layer 23 and initializing layer 24 are made to align in the same direction, for example, in the downward direction in the drawing (refer to states (a) and (b) in FIG. 8). This is achieved by applying a sufficiently large magnetic field first. At this time, the transition metal sub-lattice magnetization direction of the memory layer 21 may be aligned in either the upward (refer to state (a) in FIG. 8) or downward direction (refer to state (b) in FIG. 8).

In the high-temperature operation (B), the magnetic film is irradiated with a recording light beam of a high intensity thereby to raise the temperature thereof to a temperature in the vicinity of the Curie temperature of the recording layer 22. Then magnetization of the memory layer 21 and switching layer 23 is lost and the magnetization direction of the recording layer 22 is aligned in the direction (the upward direction in the drawing) of an external magnetic field (refer to state (c) in FIG. 8), regardless of the initial state, (a) or (b) in FIG. 8. In a cooling step that follows, when the temperature of the magnetic film drops to a temperature below the Curie temperature of the memory layer 21 and the magnetization of the memory layer appears, the transition metal sub-lattice magnetization direction of the memory layer 21 is aligned with that (the upward direction) of the recording layer 22 by an exchange-coupling force (refer to state (d) in FIG. 8). Further, when the temperature of the magnetic film drops to a temperature below the Curie temperature of the switching layer 23 and the magnetization of the switching layer appears, the transition metal sub-lattice magnetization direction of the recording layer 22 is aligned with that (the downward direction) of the initializing layer 24 through the switching layer 23. Thus, the state (a) in FIG. 8 is restored. In the above procedure the transition metal sub-lattice magnetization direction of the initializing layer 24 is set to always align in one direction.

In the low-temperature operation (C), the magnetic film is irradiated with recording light beam of a low intensity thereby to raise the temperature thereof to a temperature in the vicinity of the Curie temperature of the memory layer 21. Then the transition metal sub-lattice magnetization direction of the memory layer 21 is aligned with that (the downward direction) of the recording layer 22 (refer to state (e) in FIG. 8) by an exchange-coupling force, regardless of the initial state, (a) or (b) in FIG. 8. When the magnetic film is cooled to room temperature, the state (b) in FIG. 8 is resumed.

Since the magnetization direction of the memory layer 21 is aligned in the upward direction by the high-temperature operation (B) or in the downword direction by the low-temperature operation, direct overwriting can be achieved if the intensity of recording light beam is modulated in a binary fashion, i.e., high or low in accordance with binary-coded information "0" or "1". Hereinafter the high-intensity of the recording light beam for the high-temperature operation (B) will be represented by $P_H$, while the low-intensity thereof for the low-temperature operation will be represented by $P_L$.

As described above, there have been proposed, on one side, a magneto-optical recording medium capable of super-resolutive reproduction and, on the other side, one allowing direct overwriting. However, either the former or the latter does not allow both superresolutive reproduction and direct overwriting. To make these merits compatible with each other in one magneto-optical recording medium, the light beam needs to have three degrees of intensity, i.e., a light beam intensity $P_R$ for the superresolutive reproduction in addition to the two light beam intensities for overwriting, $P_H$ for the high-temperature operation and $P_L$ for the low-temperature operation. Further, it is desired that an expected operation be assuredly achieved in accordance with each light beam intensity so as to make satisfactory superresolution behavior and satisfactory overwriting behavior compatible with each other, and that the light beam intensities $P_H$, $P_L$ and $P_R$ each have a sufficient margin (or allowance). A phenomenon must not occur such that during superresolutive reproduction at the light beam intensity $P_R$ the low-temperature operation happens thereby changing the recorded information. In addition, where a magneto-optical material, such as a NdFeCo film, Pt/Co multilayered film or the like, which produces a large reproductive signal output in response to light of a short wavelength is used in the medium allowing both superresolutive reproduction and overwriting, it is not clarified yet how and what to do in order to improve both superresolution behavior and overwriting behavior as well as the behavior in response to light of a short wavelength.

Either is not clarified yet the relation between the direction of an external magnetic field to be applied for overwriting and the direction of an external magnetic field to be applied for superresolutive reproduction when direct-overwritten information is to be reproduced.

The present invention has been attained to overcome the foregoing problems. It is, therefore, an object of the present invention to provide a magneto-optical recording medium which allows superresolutive reproduction and direct overwriting.

It is another object of the present invention to provide a recording/reproduction method which is capable of recording or reproducing information without destroying recorded information within an extensive light intensity range of reproduction light beam with use of a magneto-optical recording medium allowing superresolutive reproduction and overwriting.

SUMMARY OF THE INVENTION

According to the present invention, there is provided a magneto-optical recording medium comprising a first magnetic layer made of a rare earth-transition metal alloy or a ferromagnetic material containing a magnetic transition metal, a second magnetic layer made of a rare earth-transition metal alloy, a third magnetic layer made of a rare earth-transition metal alloy, a fourth magnetic layer made of a rare earth-transition metal alloy, a fifth magnetic layer made of a rare earth-transition metal alloy, and a sixth magnetic layer made of a rare earth-transition metal alloy, said second to sixth magnetic layers being stacked in this order on said first magnetic layer, adjacent layers of said second to sixth magnetic layers being coupled by an exchange force thereof, wherein said first magnetic layer has a Curie temperature higher than that of said second magnetic layer; said third magnetic layer has a Curie temperature higher than that of said second magnetic layer; said fourth magnetic layer has a Curie temperature higher than that of said third magnetic layer; said sixth magnetic layer has a Curie temperature higher than that of said third magnetic layer; said fourth magnetic layer has a Curie temperature higher than that of said fifth magnetic layer; said sixth magnetic layer has a Curie temperature higher than that of said fifth magnetic layer, and wherein magnetization of said third magnetic layer is not inversed by an inversion of magnetization of said fourth magnetic layer at room temperature; a magnetization direction of transition metal sub-lattice of said first magnetic layer made of said rare earth-transition metal alloy or a magnetization direction of said first magnetic layer made of said ferromagnetic material and a magnetization direction of transition metal sub-lattice of said second magnetic layer are aligned in an upward direction within a region where a magnetization direction of transition metal sub-lattice of said third magnetic layer is aligned in the upward direction, while aligned in a downward direction within a region where the magnetization direction of transition metal sub-lattice of said third magnetic layer is aligned in the downward direction; and respective magnetization directions of transition metal sub-lattice of said fourth, fifth and sixth magnetic layers are aligned in either the upward or downward direction.

In the magneto-optical recording medium according to the present invention, the fifth magnetic layer preferably has a Curie temperature higher than that of the second magnetic layer.

Further, it is preferable that the first magnetic layer is made of a rare earth-transition metal alloy in which magnetization of transition metal sub-lattice thereof is predominant, or of a ferromagnetic material containing a magnetic transition metal, while at the same time the fourth magnetic layer is made of a rare earth-transition metal alloy having a compensation temperature between room temperature and the Curie temperature thereof.

Further, the second magnetic layer of the magneto-optical recording medium according to the present invention is preferably made of a rare earth-transition metal alloy containing Ho, represented by the general formula (I)

(I)

where RE1 is a rare earth metal other than Ho, $x \geq 0.02$, $0.05 \leq y \leq 0.2$, and $0 \leq z \leq 1$.

Further, the first magnetic layer of the magneto-optical recording medium according to the present invention is preferably made of a rare earth-transition metal alloy containing Nd, represented by the general formula (II)

(II)

where RE2 is a rare earth metal other than Nd, $u \geq 0.1$, $0.05 \leq v \leq 0.2$, and $0 \leq w \leq 1$.

Alternatively, the first magnetic layer of the magneto-optical recording medium according to the present invention is preferably composed of a multilayered film of a ferromagnetic material in which a platinum layer and a cobalt layer, or a palladium layer and a cobalt layer are alternately stacked, wherein the thickness of the platinum layer or palladium layer as a unit is within the range of 0.7 to 1.8 nm, while the thickness of the cobalt layer as a unit is within the range of 0.3 to 1.4 nm.

Further, the first magnetic layer is preferably formed by sputtering process with a biased substrate.

According to the present invention, there is also provided a recording/reproduction method for the above magneto-optical recording medium, comprising applying external magnetic fields of the same direction for recording information and reproducing information, respectively.

The magneto-optical recording medium according to the present invention allows both superresolutive reproduction and direct overwriting.

With the magneto-optical recording medium wherein the fifth magnetic layer has a Curie temperature higher than that of the second magnetic layer, the operation of superresolutive reproduction and that of the direct overwriting will not interfere with each other, and stable and favorable reproduction characteristics can be exhibited.

With the magneto-optical recording medium wherein the first magnetic layer is made of a rare earth-transition metal alloy in which magnetization of transition metal sub-lattice thereof is predominant, while at the same time the fourth magnetic layer has a compensation temperature between room temperature and the Curie temperature thereof, or wherein the first magnetic layer is made of a ferromagnetic material containing a magnetic transition metal element (hereinafter referred to as "ferromagnetic material" simply), while the fourth magnetic layer has a compensation temperature between room temperature and the Curie temperature thereof, stable superresolutive reproduction can be achieved without occurrence of magnetization inversion of a record bit during reproduction.

With the magneto-optical recording medium wherein the second magnetic layer is made of a rare earth-transition metal alloy containing Ho, represented by the general formula (I), the light beam intensity for superresolutive reproduction can be reduced without affecting direct overwriting characteristics.

With the magneto-optical recording medium wherein the first magnetic layer is composed of a rare earth-transition metal alloy containing neodymium, represented by the general formula (II), or wherein the first magnetic layer is made of a multilayered film of a ferromagnetic material in which a platinum layer and a cobalt layer, or a palladium layer and a cobalt layer are alternately stacked; and the thickness of the platinum or palladium layer as a unit is within the range of 0.7 to 1.8 nm, while the thickness of the cobalt layer is within the range of 0.3 to 1.4 nm, superresolutive reproduction and direct overwriting are possible with light of a short wavelength since a magneto-optical recording material is used which is advantageous in reproduction with light of such a short wavelength.

With the magneto-optical recording medium wherein the first magnetic layer is formed by a substrate bias sputtering process, an external magnetic field for the operation of superresolutive reproduction can be reduced.

In the recording/reproducing method for the magneto-optical recording medium according to the present invention, the direction of an external magnetic field applied for recording information is the same as that of an external magnetic field applied for reproducing information. Hence, the margin of the light beam intensity for the superresolutive reproduction can be greatly increased.

BRIEF EXPLANATION OF THE DRAWINGS

FIG. 3 is an explanatory view for illustrating a high-temperature operation in a direct overwriting operation of the magneto-optical recording medium according to the present invention;

FIG. 6 is an explanatory view for illustrating the magnetization direction of each magnetic layer in the operation of superresolutive reproduction in Example 1 of the magneto-optical recording medium according to the present invention and in Comparative Example 1;

DETAILED DESCRIPTION

Hereinafter, the present invention will be described more specifically by way of examples thereof.

EXAMPLE 1

Figure 1:
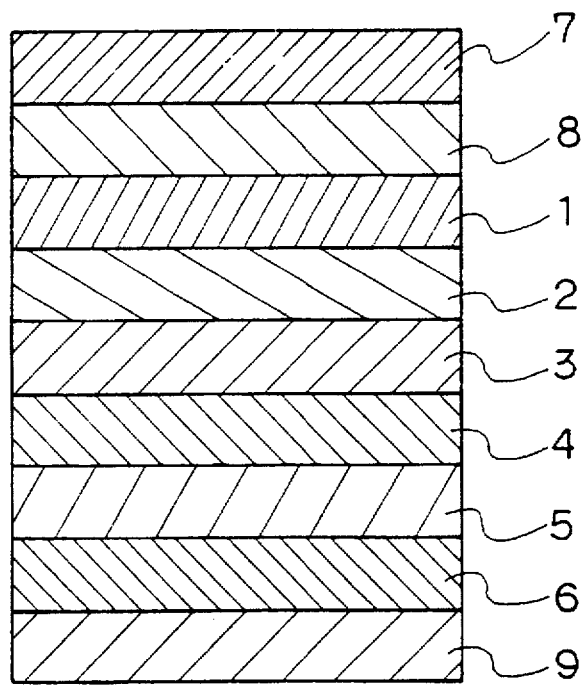
FIG. 1 is a sectional view showing one embodiment of the structure of a magneto-optical recording medium according to the present invention.

FIG. 1 shows the structure of one example of a magneto-optical recording medium according to the present invention. This recording medium was constructed by forming on a glass substrate the following magnetic layers, dielectric layer and protective layer by a thin-film formation process using sputtering.

In FIG. 1, numeral 1 denotes a first magnetic layer, numeral 2 denotes a second magnetic layer, numeral 3 denotes a third magnetic layer, numeral 4 denotes a fourth magnetic layer, numeral 5 denotes a fifth magnetic layer, numeral 6 denotes a sixth magnetic layer, numeral 7 denotes a substrate, numeral 8 denotes a dielectric layer, and numeral 9 denotes a protective layer. An example of materials used in Example 1 and each thickness thereof are shown in Table 1.

TABLE 1

| Layer: Material | Thickness (nm) | Curie temperature |
| --- | --- | --- |
| Dielectric layer: $SiN_x$ | 65 | |
| First magnetic layer: $Gd_{0.19}Fe_{0.69}Co_{0.12}$ | 25 | above 300° C. |
| Second magnetic layer: $Tb_{0.15}Fe_{0.84}Co_{0.01}$ | 8 | 120° C. |

TABLE 1-continued

| Layer: Material | Thickness (nm) | Curie temperature |
|---|---|---|
| Third magnetic layer: $Tb_{0.21}Fe_{0.70}Co_{0.09}$ | 40 | 210° C. |
| Fourth magnetic layer: $Dy_{0.25}Fe_{0.50}Co_{0.25}$ | 40 | 250° C. |
| Fifth magnetic layer: $Tb_{0.15}Fe_{0.78}Co_{0.07}$ | 20 | 170° C. |
| Sixth magnetic layer: $Tb_{0.25}Fe_{0.15}Co_{0.60}$ | 40 | above 300° C. |
| Protective layer: $SiN_x$ | 80 | |

Each value indicating the content of a material contained in each of the magnetic layers is an atomic proportion.

The material and content for each magnetic layer is merely an example and, therefore, the present invention is not limited thereto. In the present example of the magneto-optical recording medium, adjacent magnetic layers are magnetically coupled with each other by an exchange force. Recording/reproduction light beam is adapted to be incident on the side of the first magnetic layer.

The first magnetic layer mainly contributes to reproduction of the magnetization pattern (bit domain) thereof, and forms a "mask" in the superresolutive reproduction. The second magnetic layer serves to cut off the exchange force between the first and third magnetic layers. The third magnetic layer records and retains information. The fourth, fifth and sixth magnetic layers do not serve as information medium but work for light-modulated direct overwriting. The sub-lattice magnetization of the sixth layer will not be inversed against a rise in temperature due to irradiation of light beam within the operation range. The fifth magnetic layer serves to cut off the exchange force from the sixth magnetic layer during the high-temperature operation.

The magnetic layers are designed as follows: the first magnetic layer has a Curie temperature higher than that of the second magnetic layer; the third magnetic layer has a Curie temperature higher than that of the second magnetic layer; the fourth magnetic layer has a Curie temperature higher than that of the third magnetic layer; the sixth magnetic layer has a Curie temperature higher than that of the third magnetic layer; the fourth magnetic layer has a Curie temperature higher than that of the fifth magnetic layer; and the sixth magnetic layer has a Curie temperature higher than that of the fifth magnetic layer. Preferably, the fifth magnetic layer is made to have a Curie temperature higher than that of the second magnetic layer.

Further, the third magnetic layer is adapted to have a magnetization such as not to be inversed at room temperature by inversion of the magnetization of the fourth magnetic layer. The respective sub-lattice magnetization directions of the first and second magnetic layers at room temperature are adapted to be aligned in the upward direction within the region where the sub-lattice magnetization direction of the third magnetic layer is in the upward direction while aligned in the downward direction within the region where the sub-lattice magnetization direction of the third magnetic layer is in the downward direction. Besides, the respective sub-lattice magnetization directions of the fourth, fifth and sixth magnetic layers at room temperature are adapted to align in either the upward or downward direction.

It is possible, at room temperature, to align the respective sub-lattice magnetization directions of the first to third magnetic layers in one direction and of the fourth to sixth magnetic layers in one direction by virtue of the exchange force working between adjacent layers. The magnetization of the third magnetic layer is required not to be inversed against the exchange force which will make the sub-lattice magnetization direction of the third magnetic layer align with that of the fourth magnetic layer so as not to be inversed by magnetization inversion of the fourth magnetic layer. The third magnetic layer is influenced by the exchange force from not only the fourth magnetic layer but also the second magnetic layer. Hence, to be precise, the following conditional expression (1) needs to be satisfied at room temperature:

$$\sigma 4/(2 \cdot Ms \cdot t) - \sigma 2/(2 \cdot Ms \cdot t) < Hc \quad (1)$$

where σ2 represents the interfacial domain wall energy between the second and third magnetic layers, σ4 represents the interfacial domain wall energy between the third and fourth magnetic layers, Ms represents the saturation magnetization of the third magnetic layer, t represents the thickness of the third magnetic layer, and Hc represents the coercive force of the third magnetic layer.

The first term on the left side of the above expression (1) refers to the action of causing the sub-lattice magnetization of the third magnetic layer to align with that of the fourth magnetic layer by the exchange force from the fourth magnetic layer, while the second term thereon refers to the action of causing the sub-lattice magnetization of the third magnetic layer to align with that of the second magnetic layer by the exchange force from the second magnetic layer. Hc on the right side of the above expression (1) refers to the action against the magnetization inversion of the third magnetic layer. Hence, the above conditional expression (1) means that the action by the coercive force is greater than that by the exchange force. Therefore, if σ2, σ4, Ms, t and Hc are set to satisfy the conditional expression (1), the magnetization of the third magnetic layer will not be inversed by the magnetization inversion of the fourth magnetic layer. The magneto-optical recording medium of the present invention, in particular, is constituted so that the sub-lattice magnetization direction would be aligned with that of the third magnetic layer. Hence, the action by the exchange force from the second magnetic layer (the second term on the left side of the conditional expression (1)) always favorably works for satisfying the conditional expression (1). This is effective in realizing the present invention. By making each magnetic layer satisfy the above condition, the magneto-optical recording medium according to the present invention comes to allow both direct overwriting and superresolutive reproduction.

The first magnetic layer satisfying the above condition is composed of a rare earth-transition metal alloy or a ferromagnetic material. Examples of such a rare earth-transition metal alloy or a ferromagnetic material include, as well as the above-noted $Gd_{0.19}Fe_{0.69}Co_{0.12}$ alloy, a rare earth-transition metal alloy containing Gd, represented by the general formula (III), a rare earth-transition metal alloy containing Nd, represented by the general formula (II), a multilayered film of a ferromagnetic material in which a platinum layer and a cobalt layer, or a palladium layer and a cobalt layer are alternately stacked, the thickness of the platinum or palladium unit layer being within the range of 0.7 to 1.8 nm, the thickness of the cobalt unit layer being within the range of 0.3 to 1.4 nm, and an alloy containing each of those materials as a main ingredient.

$$(Gd_{1-p-q}Tb_pDy_q)_r(Fe_{1-s}Co_s)_{1-r} \quad (III)$$

where $0 \leq p \leq 0.8$, $0 \leq q \leq 0.8$, $0 \leq p+q<1$, $0.05 \leq r \leq 0.3$, and $0 \leq s \leq 1$.

$$(RE2_{1-u}Nd_u)_v(Fe_{1-w}Co_w)_{1-v} \quad (II)$$

where RE is a rare earth metal other than Nd, $u \geq 0.1$, $0.05 \leq v \leq 0.2$, and $0 \leq w \leq 1$.

The thickness of the first magnetic layer is preferably in the range of 10 to 35 nm.

The second magnetic layer satisfying the above condition is composed of a rare earth-transition metal alloy. Examples of such an alloy include, as well as the above-noted $Tb_{0.15}Fe_{0.84}Co_{0.01}$ alloy, a rare earth-transition metal alloy represented by the general formula (IV), a rare earth-transition metal alloy containing Ho, represented by the general formula (I), and an alloy containing each of those alloys as a main ingredient and a nonmagnetic element such as Al, Ti, Cr, Si, B or the like. The thickness of the second magnetic layer is preferably in the range of 3 to 20 nm.

$$(Tb_{1-a}Dy_a)_b(Fe_{1-c}Co_c)_{1-b} \quad \text{(IV)}$$

where $0 \leq a \leq 1$, $0.05 \leq b \leq 0.4$, and $0 \leq c \leq 0.5$.

$$(RE1_{1-x}Ho_x)_y(Fe_{1-z}Co_z)_{1-y} \quad \text{(I)}$$

where RE1 is a rare earth metal other than Ho, $x \geq 0.02$, $0.05 \leq y \leq 0.2$, and $0 \leq z \leq 1$.

The third magnetic layer satisfying the above condition is composed of a rare earth-transition metal alloy. Examples of such an alloy include, as well as the above-noted $Tb_{0.21}Fe_{0.70}Co_{0.09}$ alloy, a rare earth-transition metal alloy represented by the general formula (V):

$$(Tb_{1-d}Dy_d)_e(Fe_{1-f}Co_f)_{1-e} \quad \text{(V)}$$

where $0 \leq d \leq 1$, $0.1 \leq e \leq 0.3$, and $0 \leq f \leq 0.5$; and an alloy containing each of those alloys as a main ingredient. The thickness of the third magnetic layer is preferably in the range of 10 to 50 nm.

The fourth magnetic layer satisfying the above condition is composed of a rare earth-transition metal alloy. Examples of such an alloy include, as well as the above-noted $Dy_{0.25}Fe_{0.50}Co_{0.25}$, a rare earth-transition metal alloy containing Tb or Dy, represented by the general formula (VI) and an alloy containing each of those alloys as a main ingredient.

$$(Gd_{1-g-h}Tb_gDy_h)_i(Fe_{1-k}Co_k)_{1-i} \quad \text{(VI)}$$

where $0 \leq g \leq 1$, $0 \leq h \leq 1$, $0 < g+h \leq 1$, $0.1 \leq j \leq 0.4$, and $0 \leq k \leq 1$.

Preferably the fourth magnetic layer, in particular, has such a property that compensation temperature ranges between room temperature and the Curie temperature thereof. The thickness of the fourth magnetic layer is preferably in the range of 10 to 80 nm.

The fifth magnetic layer satisfying the above condition is composed of a rare earth-transition metal alloy. Examples of such an alloy include, as well as the above-noted $Tb_{0.15}Fe_{0.78}Co_{0.07}$ alloy, a rare earth-transition metal alloy represented by the general formula (VII) and an alloy containing each of those alloys as a main ingredient and a nonmagnetic element such as Al, Ti, Cr, Si, B or the like. The thickness of the fifth magnetic layer is preferably in the range of 3 to 20 nm.

$$(Tb_{1-\alpha}Dy_\alpha)_\beta(Fe_{1-\delta}Co_\delta)_{1-\beta} \quad \text{(VII)}$$

where $0 \leq \alpha \leq 1$, $0.05 \leq \beta \leq 0.4$, and $0 \leq \delta \leq 0.5$.

The sixth magnetic layer satisfying the above condition is composed of a rare earth-transition metal alloy. Examples of such an alloy include, as well as the above-noted $Tb_{0.25}Fe_{0.15}Co_{0.60}$ alloy, a rare earth-transition metal alloy represented by the general formula (VIII) and an alloy containing each of those alloys as a main ingredient. The thickness of the sixth magnetic layer is preferably in the range of 10 to 80 nm.

$$(Tb_{1-\zeta}Dy_\zeta)_\eta(Fe_{1-\theta}Co_\theta)_{1-\eta} \quad \text{(VIII)}$$

where $0 \leq \zeta \leq 1$, $0.1 \leq \eta \leq 0.4$, and $0 < \theta \leq 1$.

To be described next is the operation of the magneto-optical recording medium thus constructed.

An initializing operation (A) of the magneto-optical recording medium according to the present invention is first described which is illustrated in FIG. 2. In FIG. 2 and in the drawings that follow, a large arrow indicates the magnetization direction of each of the six magnetic layers, while a small arrow in the large arrow the transition metal sub-lattice magnetization direction thereof, and same reference characters denote like or corresponding parts shown in FIG. 1. It is to be noted that if the first magnetic layer is composed of the ferromagnetic material, the transition metal sub-lattice magnetization direction thereof is aligned with the magnetization direction thereof. Further, a horizontally-extending line indicates a state where the magnetization is lost because of a rise in the temperature of the magnetic film above the Curie temperature thereof; and a hatched portion indicates an interfacial domain wall produced between adjacent magnetic layers of which respective sub-lattice magnetization directions are antiparallel. Hereinafter, the magnetization of transition metal sub-lattice will be simply referred to as "sub-lattice magnetization" unless specifically noted.

After the construction of the magneto-optical recording medium, the respective sub-lattice magnetization directions of the fourth to sixth magnetic layers are made to align in one direction, for example, in the downward direction. This is achieved by, for example, applying first a sufficiently large magnetic field or when an extremely large inversed magnetic field is present, heating or cooling the whole magnetic film while applying a magnetic field thereto. In this case the sub-lattice magnetization direction of the third magnetic field may be aligned either upward (state in FIG. 2(a)), or downward (state in FIG. 2(b)). The sub-lattice magnetization direction of the second magnetic layer is aligned with that of the third magnetic layer by the exchange force from the third magnetic layer and, similarly, the sub-lattice magnetization direction of the first magnetic layer is aligned with that of the second magnetic layer by the exchange force from the second magnetic layer. As a result, the respective sub-lattice magnetization directions of the first to third magnetic layers are aligned in the same direction. If the transition metal sub-lattice magnetization or the rare-earth-metal sub-lattice magnetization is predominant in both the fourth and sixth magnetic layers, the magnetization directions of these layers can be conveniently aligned by uniform magnetic fields of the same direction. To prevent an inversion of the magnetization of the sixth magnetic layer within the temperature range for operation, it is desired that the magnetization of the rare-earth-metal sub-lattice having a relatively large coercive force be predominant up to a relatively high temperature. It is, therefore, desired that the rare-earth-metal sub-lattice magnetization be predominant in both the fourth and sixth magnetic layers. The predominance of the rare-earth-metal sub-lattice magnetization herein means that the magnetization of rare-earth-metal sub-lattice is larger than that of the transition metal sub-lattice at room temperature, and that the direction of the resulting magnetization appearing outside is aligned with the rare-earth-metal magnetization direction.

Next, a high-temperature operation (B) of the magneto-optical recording medium according to the present invention is described. FIG. 3 illustrates the high-temperature operation among direct overwriting operations of the magneto-optical recording medium according to the present invention and wherein like reference characters are used to denote like or corresponding parts shown in FIG. 1. The magneto-optical recording medium is irradiated with recording light beam of an intensity $P_H$ for the high-temperature operation thereby to raise the temperature of the magnetic film up to the vicinity of the Curie temperature of the fourth magnetic layer. At the same time therewith, an external magnetic field orienting upward is applied as a recording magnetic field.

Figure 2A:
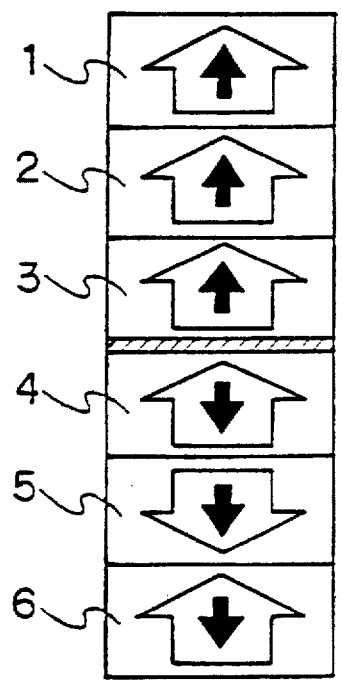
FIG. 2 is an explanatory view for illustrating an initializing operation of the magneto-optical recording medium according to the present invention.

At this time, regardless of the initialized state, in FIG. 2(a) or (b), the magnetizations of the second, third and fifth magnetic layers are lost and, hence, the fourth magnetic layer is not influenced by the exchange force from other magnetic layers. As a result, the sub-lattice magnetization direction of the fourth magnetic layer is aligned with the direction of the external magnetic field, i. e., the upward direction (refer to the state in FIG. 3(a)).

In a subsequent cooling step, when the temperature of the magnetic film is first made to drop down to below the Curie temperature of the third magnetic layer, the magnetization of the third magnetic layer appears. In this case the sub-lattice magnetization direction of the third magnetic layer is aligned with that of the fourth magnetic layer, i.e. the upward direction, by the exchange force from the fourth magnetic layer (refer to the state (b) in FIG. 3).

Subsequently, when the temperature of the magnetic film is made to drop down to below the Curie temperature of the fifth magnetic layer, the magnetization of the fifth magnetic layer appears. In this case the sub-lattice magnetization direction of the fifth magnetic layer is aligned with that of the sixth magnetic layer, i.e., the downward direction, by the exchange force from the sixth magnetic layer. Successively the sub-lattice magnetization direction of the fourth magnetic layer is aligned with that of the fifth magnetic layer, i.e., the downward direction (refer to the state in FIG. 3(c)).

In the cooling step, when the temperature of the magnetic film is made to drop down to below the Curie temperature of the second magnetic layer, the magnetization of the second magnetic layer appears. In this case the sub-lattice magnetization direction of the second magnetic layer is aligned with that of the third magnetic layer, i.e. the upward direction, by the exchange force from the third magnetic layer. Successively the sub-lattice magnetization direction of the first magnetic layer is aligned with that of the second magnetic layer, i.e., the upward direction, by the exchange force from the second magnetic layer (refer to the state in FIG. 3(d)).

As described above, regardless of the initial state in FIGS. 2(a) or (b), the high-temperature operation (B) realizes the state in FIG. 3(d), which is identical with the state in FIG. 2(a). This state can be made to correspond to, for example, information "1".

Figure 4A:
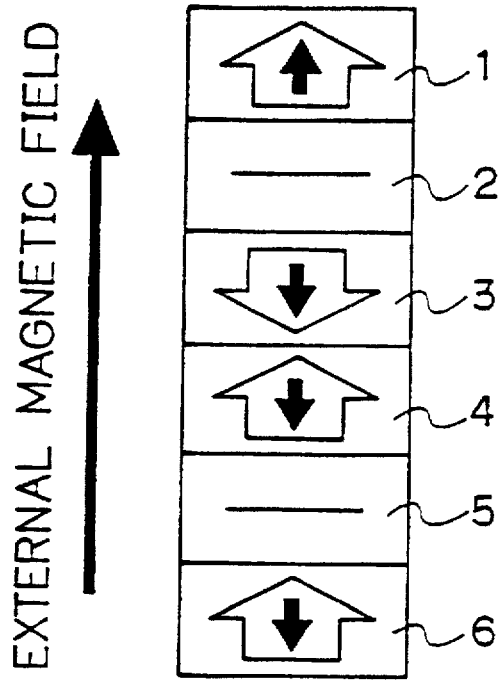
FIG. 4 is an explanatory view for illustrating a low-temperature operation in the direct overwriting operation of the magneto-optical recording medium according to the present invention.

FIG. 4 illustrates a low-temperature operation (C) which belongs to the direct overwriting operation of the magneto-optical recording medium according to the present invention. In FIG. 4, same reference characters are used to denote like or corresponding parts shown in FIG. 1. In the low-temperature operation the magneto-optical recording medium is irradiated with recording light beam having an intensity $P_L$ for the low-temperature operation. Then the temperature of the magnetic film is raised up to the vicinity of the Curie temperature of the third magnetic layer.

At this time the magnetization of the second magnetic layer is lost regardless of the state in FIGS. 2(a) or (b) which is initialized by the initializing operation (A). Thus the sub-lattice magnetization direction of the third magnetic layer is not influenced by the exchange force from the second magnetic layer and is, hence, aligned with the sub-lattice magnetization direction of the fourth magnetic layer, i.e. the downward direction, by the exchange force from the fourth magnetic layer (refer to the state in FIG. 4(a)).

Subsequently, when the temperature of the magnetic film is made to drop down to below the Curie temperature of the second magnetic layer, the magnetization of the second magnetic layer appears. At this time the sub-lattice magnetization direction of the second magnetic layer is aligned with that of the third magnetic layer, i. e., the downward direction, by the exchange force from the third magnetic layer. Likewise, the sub-lattice magnetization direction of the first magnetic layer is aligned with that of the second magnetic layer, i.e. the downward direction, by the exchange force from the second magnetic layer (refer to the state in FIG. 4(b).

Figure 2B:
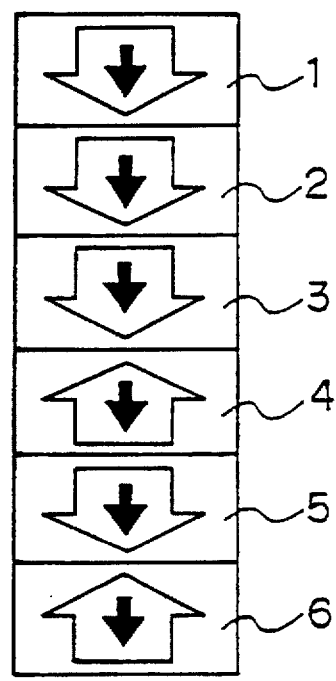
Figure 4B:
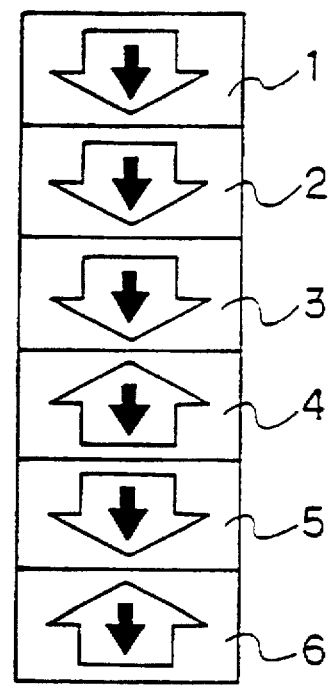

As described above, regardless of the initial state in FIGS. 2(a) or (b), the low-temperature operation realizes the state in FIG. 4(b), which is identical with the state in FIG. 2(b). This state can be made to correspond to, for example, information "0".

Figure 5:
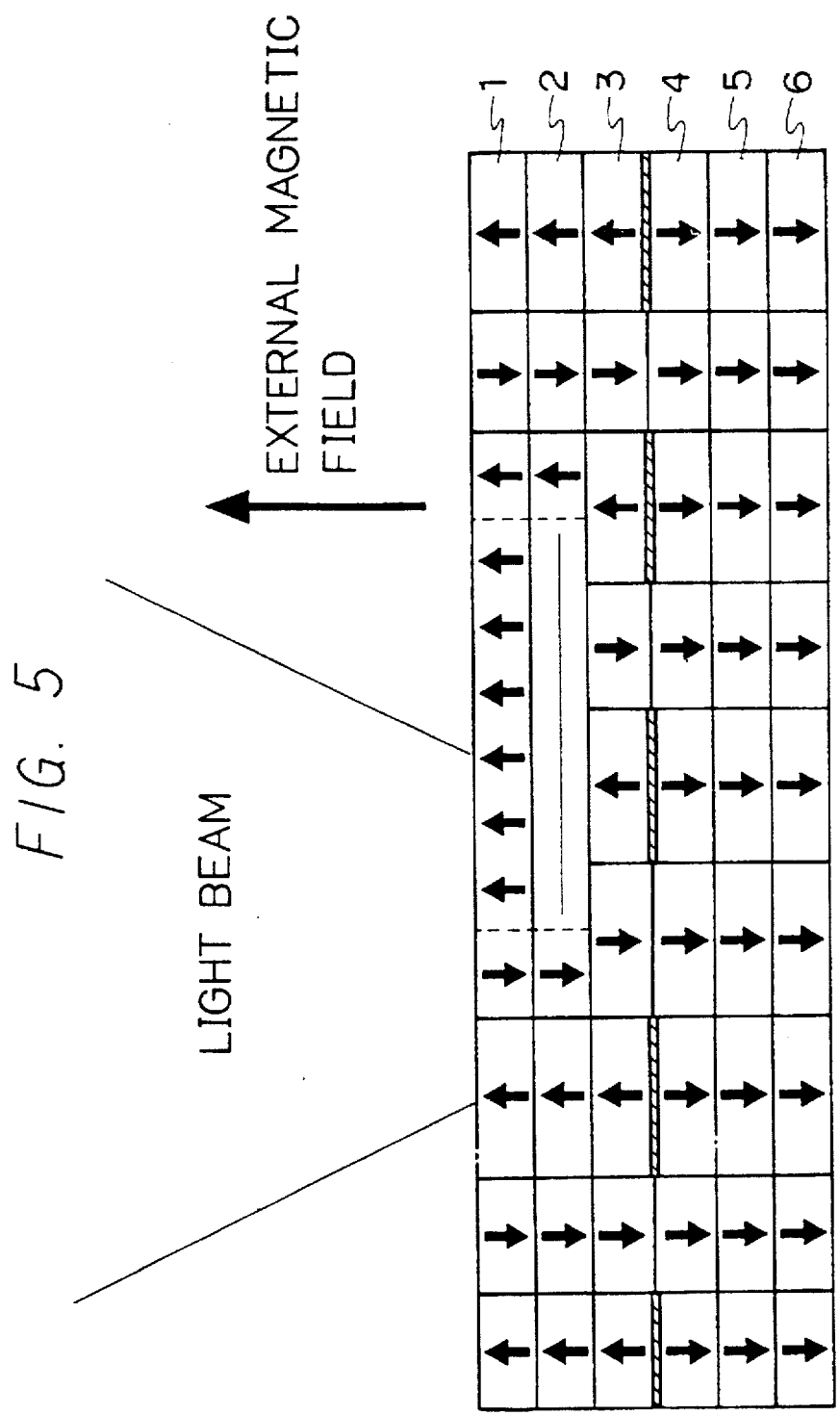
FIG. 5 is an explanatory view for illustrating an operation of superresolutive reproduction of the magneto-optical recording medium according to the present invention.
Figure 7:
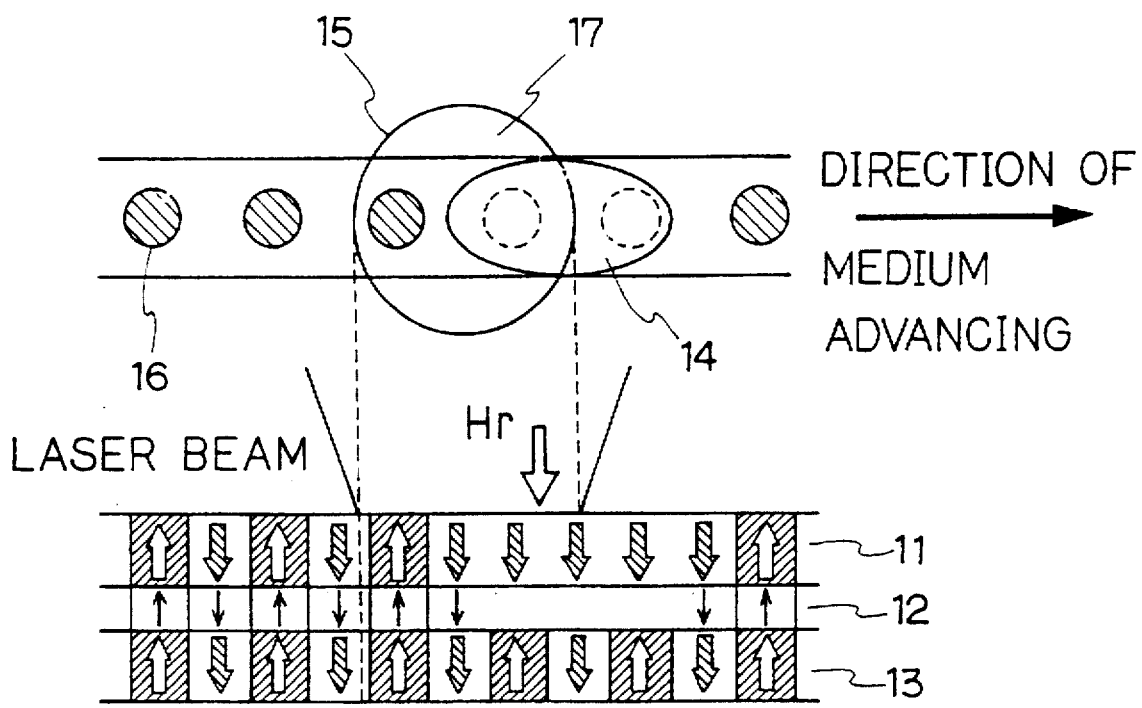
FIG. 7 is an explanatory view showing a conventional magneto-optical recording medium allowing superresolutive reproduction.
Figure 8:
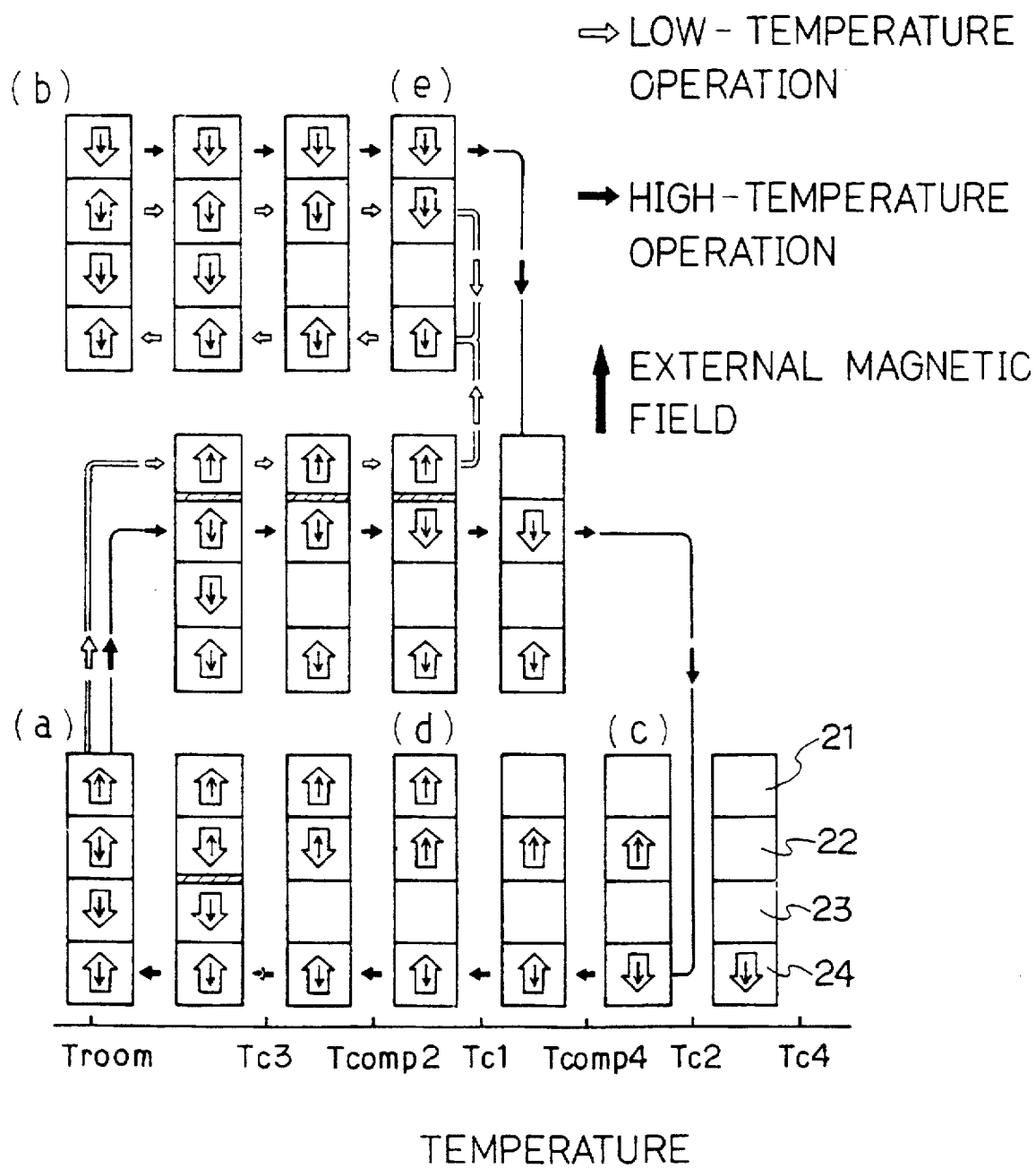
FIG. 8 is an explanatory view for illustrating a direct overwriting operation of a conventional magneto-optical recording medium allowing direct overwriting.

To be described next is the superresolutive reproduction operation. FIG. 5 illustrates the operation of reproducing with superresolution the information recorded as magnetization patterns in FIGS. 2(a) and (b) by the direct overwriting operation including the high-temperature operation (B) and low-temperature operation (C). In FIG. 5, same reference characters denote like or corresponding parts shown in FIG. 1, indication of a magnetization direction is omitted, and the recording medium advances to the right in the drawing. The temperature of the magnetic film is raised when it is given reproduction light energy, and there is produced a temperature distribution having a peak on the medium-advancing side of the reproduction light spot. In this temperature distribution of the magnetic film, the exchange coupling between the first and third magnetic layers is cut off at a region of which temperature is raised up to above the Curie temperature of the second magnetic layer. As a result in such a region the magnetization direction of the first magnetic layer is not restrained any more by the third magnetic layer and is, hence, aligned with the direction of an external magnetic field. Then such a region in the light spot where the magnetization direction of the reproductive layer is aligned with the direction of the external magnetic field becomes a "mask" region, which will not contribute to a reproductive signal component. Therefore, a reproductive signal is detected from the region other than the "mask" region. This means that the diameter of the light spot is virtually reduced. Consequently it becomes possible to reproduce a microscopic bit domain which is beyond the limit of the optical resolution power dependent on the diameter of a light spot. In other words, the superresolutive reproduction becomes feasible.

By virtue of the above operations, the magneto-optical recording medium according to the present invention allows both the direct overwriting operation and the superresolutive reproduction operation.

The recording medium of the present example wherein the combination of Curie temperatures of the second and fifth magnetic layers was variously varied was examined for its reproduction property, or a carrier to noise ratio (CN ratio), and the results were as shown in Table 2. The respective Curie temperatures of the second and fifth magnetic layers were varied by varying the contents of each layer. Specifically, in the $Tb_n(Fe_{1-m}Co_m)_{1-n}$ film was varied the content of Tb (n) or the ratio of Co (m) to FeCo including the case where Co was not contained. The contents (m) and (n) corresponding to different Curie temperatures of each of the second and fifth magnetic layers were as shown in Table 3. The thicknesses of the second and fifth magnetic layers were 8 nm and 20 nm. respectively. In Tables 2 and 3, $Tc_2$ denotes the Curie temperature of the second magnetic layer, and $Tc_5$ denotes that of the fifth magnetic layer. Further, in FIG. 1, for the medium giving no reproductive signal a dash (horizontal line) is given instead of showing the CN ratio.

TABLE 2

| $Tc_2/Tc_5$ | 110° C. | 120° C. | 135° C. | 145° C. | 155° C. | 170° C. |
| --- | --- | --- | --- | --- | --- | --- |
| 120° C. | 28.5 dB | 43.3 dB | 48.7 dB | 50.3 bB | 51.2 dB | 50.8 dB |
| 130° C. | 19.7 dB | 23.2 dB | 46.3 dB | 50.2 bB | 51.8 dB | 49.3 dB |
| 140° C. | — | 17.6 dB | 21.1 dB | 47.3 bB | 49.6 dB | 50.2 dB |
| 150° C. | — | — | — | 18.5 bB | 15.3 dB | 45.4 dB |
| 165° C. | — | — | — | — | 10.6 dB | 42.1 dB |
| 180° C. | — | — | — | — | — | — |

TABLE 3

| Second magnetic layer | | | Fifth magnetic layer | | |
| --- | --- | --- | --- | --- | --- |
| | Content | | | Content | |
| $Tc_2$(°C.) | n | m | $Tc_5$(°C.) | n | m |
| 120 | 0.15 | 0.012 | 110 | 0.12 | 0.012 |
| 130 | 0.15 | 0.024 | 120 | 0.15 | 0.012 |
| 140 | 0.15 | 0.038 | 135 | 0.15 | 0.030 |
| 150 | 0.15 | 0.052 | 145 | 0.15 | 0.045 |
| 160 | 0.15 | 0.066 | 155 | 0.15 | 0.060 |
| 180 | 0.13 | 0.082 | 170 | 0.15 | 0.082 |

Note: m and n are each a proportion of the number of atoms.

From the results shown in Table 2, it was clearly found that when $Tc_2>Tc_5$, there was obtained only an unusable CN ratio of smaller than 30 dB or no reproductive signal, and that when $Tc_2 \leq Tc_5$, there was obtained a favorable reproductive signal. This is conceivably because in the superresolutive reproduction on the medium with $Tc_2>Tc_5$ the low-temperature operation (C) occurs undesirably and thereby to erase the information recorded as a magnetization pattern. From this it is desired that the Curie temperature of the fifth magnetic layer be higher than that of the second magnetic layer. If so, very stable superresolutive reproduction operation becomes feasible.

COMPARATIVE EXAMPLE 1

In Example 1 the first magnetic layer was composed of a rare earth-transition metal alloy in which the transition metal sub-lattice magnetization was predominant, and the fourth magnetic layer was composed of a material having a compensation temperature between room temperature and the Curie temperature thereof. For comparison, a magneto-optical recording medium as a comparative example was constructed wherein the fourth magnetic layer was composed of a material not having a compensation temperature between room temperature and the Curie temperature thereof and in which the rare-earth sub-lattice magnetization was predominant at room temperature. The constitution of Comparative Example 1 was the same as that of Example 1 except for the fourth magnetic layer. The fourth magnetic layer was 40 nm thick and composed of $Dy_{0.28}Fe_{0.47}Co_{0.25}$ having a Curie temperature of 255° C.

The difference between Example 1 and the present comparative example resides in that in the high-temperature operation for direct overwriting, the transition metal sub-lattice magnetization was predominant in the fourth magnetic layer of the former while the rare-earth sub-lattice magnetization was predominant in the fourth magnetic layer of the latter. Accordingly, although an external magnetic field orienting upward was applied to the medium of Example 1 for recording, the medium of the present comparative example needed to be applied with an external magnetic field orienting downward so as to obtain the same record state as with Example 1. For simplification of the device configuration, an external magnetic field for reproduction was of the same direction with an external magnetic field for recording.

FIGS. 6(a) and (b) illustrate the media of Example 1 and Comparative Example 1, respectively, in the "mask" state where the magnetization direction of the first magnetic layer is aligned with the direction of an external magnetic field in the superresolutive reproduction operation. In these figures the magnetization condition of each layer in such media is shown, and same reference characters are used to denote like or corresponding parts shown in FIG. 1. In the case of Comparative Example 1, the sub-lattice magnetization direction of the first magnetic layer is aligned with a downwardly-orienting external magnetic field. In cooling the magnetic film to room temperature, upon appearance of the magnetization of the second magnetic layer the second magnetic layer is influenced by the exchange forces from the first and third magnetic layers simultaneously. In the case of Example 1 (FIG. 6 (a)), the respective sub-lattice magnetization directions of the first and third magnetic layers are both in the upward direction and, hence, the sub-lattice magnetization direction of the second magnetic layer is aligned upward by the exchange forces from the first and third magnetic layers. On the other hand, in Comparative Example 1 (FIG. 6 (b)) the sub-lattice magnetization direction of the first magnetic layer is aligned downward while that of the third magnetic layer is aligned upward. Accordingly, upon appearance of the magnetization of the second magnetic layer in Comparative Example 1, the sub-lattice magnetization direction of the second magnetic layer depends upon the balance of the three factors: the exchange forces from the first and third magnetic layers and the magnetization force of external magnetic field. An interfacial domain wall is produced between the first and second magnetic layers if the sub-lattice magnetization direction of the second magnetic layer is aligned upward, or between the second and third magnetic layers if it is aligned downward. In addition, an interfacial domain wall is also present between the third and fourth magnetic layers. Therefore, two interfacial domain walls in total appear in the cooling step. Since exchange energy is accumulated in each interfacial domain wall, Comparative Example 1 in the state where two interfacial domain walls are present has a large energy as compared with Example 1, which renders the medium instable. In particular, the case is not preferable where interfacial walls are produced between the second and third magnetic layers and between the third and fourth magnetic layers, respectively and the third magnetic layer is interposed between two intertacial walls because the magnetization direction of the third magnetic layer storing information becomes instable and it is possible, in the worst case, that recorded information is changed by the superresolutive reproduction operation. With Example 1, in contrast, the number of interfacial domain walls which can be produced is at most one and, thus, the superresolutive reproduction operation can be achieved stably without apprehension of change of recorded information. Thus, if the first magnetic layer is composed of a rare earth-transition metal alloy in which the transition metal sub-lattice magnetization thereof is predominant or of a ferromagnetic material, it is desired that the fourth magnetic layer have a compensation temperature between room temperature and the Curie temperature thereof.

EXAMPLE 2

A magneto-optical recording medium as another example of the present invention was constructed as having the same constitution with the medium of Example 1 except that the second magnetic layer was composed of a rare earth-transition metal alloy containing Ho, represented by the general formula (I):

$$(RE1_{1-x}Ho_x)_y(Fe_{1-z}Co_z)_{1-y} \qquad (I)$$

where RE1 is a rare earth metal other than Ho; and the thickness thereof was 10 nm. The second magentic layer of this magneto-optical recording medium is characterized by containing Ho in the rare earth metal. Such a characteristic allows the second magnetic layer to have a decreased Curie temperature and the superresolutive reproduction operation to be achieved with reproduction light beam of a decreased intensity $P_R$. This is favorable for avoiding interference between the low-temperature operation of the direct overwriting operation and the superresolutive reproduction operation because there is provided a large difference between the recording light beam intensity $P_L$ for the former and the reproduction light beam intensity $P_R$ for the latter. Also, the second magnetic layer containing Ho is suited for the superresolutive reproduction operation because a large exchange force is exerted at the interface with the first magnetic layer and with the third magnetic layer.

Table 4 shows examples of the combination of the content x (proportion of Ho in the rare earth metal), content y (proportion of the whole rare earth metal) and content z (proportion of Co in FeCo) in the above general formula for the second magnetic layer of the magneto-optical recording medium of Example 2, and a CN ratio for each of the examples. In Example 2 the rare earth metal other than Ho, represented by RE1 in the above formula was Tb. With the magneto-optical recording medium having the second magnetic layer of the content combination shown in Table 3, the reproduction light beam intensity required for the superresolutive reproduction was reduced by about 20%. Further, it can be understood from Table 4 that a particularly favorable CN ratio was obtained when x≧0.02 and 0.05≦y≦0.2. This range of these contents is, therefore, particularly suitable for the second magnetic layer of the magneto-optical recording medium of the present invention. While Tb was used as the rare earth metal RE1 other than Ho in this Example, Dy and Gd as well as Tb can be used either alone or as a mixture of two or more of these.

TABLE 4

| x | 0.01 | 0.02 | 0.02 | 0.02 | 0.02 | 1.00 | 1.00 | 1.00 | 1.00 |
|---|---|---|---|---|---|---|---|---|---|
| y | 0.15 | 0.03 | 0.05 | 0.20 | 0.23 | 0.03 | 0.06 | 0.19 | 0.25 |
| z | 0.05 | 0.05 | 0.05 | 0.05 | 0.05 | 0.75 | 0.75 | 0.75 | 0.75 |
| CN ratio (dB) | 43.6 | 45.1 | 50.3 | 51.3 | 44.2 | 42.1 | 49.6 | 51.7 | 46.1 |

EXAMPLE 3

A magneto-optical recording medium as another example of the present invention was constructed as having the same constitution with the medium of Example 1 except that the first magnetic layer was composed of a rare earth-transition metal alloy containing Nd, represented by the general formula (II):

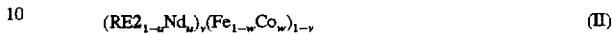

$$(RE2_{1-u}Nd_u)_v(Fe_{1-w}Co_w)_{1-v} \qquad (II)$$

where RE2 is a rare earth metal other than Nd; and the thickness thereof was 25 nm.

Table 5 shows examples of the combination of the content u (proportion of Nd in the rare earth metal), content v (proportion of the whole rare earth metal) and content w (proportion of Co in FeCo) in the above general formula for the first magnetic layer, and a CN ratio for each of the examples. In Example 3 the rare earth metal other than Nd, represented by RE2 in the above formula was Gd, but Dy and Tb as well as Gd can be used either alone or as a mixture of two or more of these. The rare earth-transition metal alloy containing Nd exhibits a large magneto-optical effect in response to light of a relatively short wavelength as compared with a rare earth-transition metal not containing Nd and is, hence, known to be a high-density recording material. The magneto-optical medium having the first magnetic layer of any content combination shown in Table 5 exhibited a larger magneto-optical effect than one having the first magnetic layer composed of a material not containing Nd in response to light of a wavelength shorter than infrared light which is frequently used at present. Among the combinations shown in Table 4 the combination satisfying u≧0.1 and 0.05≦v≦0.2 exhibited a particularly favorable CN ratio. Hence, this range for the combination of such contents is suitable for the first magnetic layer of the magneto-optical recording medium according to the present invention.

TABLE 5

| u | 0.08 | 0.10 | 0.10 | 0.10 | 0.10 | 0.80 | 0.80 | 0.80 | 0.80 |
|---|---|---|---|---|---|---|---|---|---|
| v | 0.15 | 0.02 | 0.05 | 0.20 | 0.23 | 0.02 | 0.05 | 0.20 | 0.23 |
| x | 0.15 | 0.15 | 0.15 | 0.15 | 0.15 | 0.15 | 0.15 | 0.15 | 0.15 |
| CN ratio (dB) | 41.6 | 44.1 | 49.3 | 51.1 | 43.7 | 42.1 | 48.6 | 49.6 | 43.9 |

EXAMPLE 4

A magneto-optical recording medium was constructed as having the same constitution with the medium of Example 1 except that the first magnetic layer was composed of a multilayered ferromagnetic film in which a Pt layer and a Co layer were alternately stacked 12 times each. Table 6 shows examples of the thickness ($T_{pt}$) of the PT unit layer and the thickness ($T_{Co}$) of the Co unit and the respective CN ratio of these examples. Like the rare earth-transition metal alloy containing Nd used in Example 3, the Pt/Co multilayered film is known to be a high-density recording material exhibiting a large magneto-optical effect in response to light of a short wavelength. Among the combinations shown in Table 6, a particularly favorable CN ratio was obtained when the thickness of the Pt unit layer and the thickness of the Co unit layer satisfied the range of 0.7 to 1.8 nm and the range of 0.3 to 1.4 nm, respectively. Therefore, a Pt/Co multilayered film having a thickness combination within this range is suitable for the first magnetic layer of the magneto-optical recording medium according to the present invention. Note that use of Pd instead of Pt gave a favorable CN ratio similarly.

TABLE 6

| $T_{pt}$ (nm) | 1.0 | 1.0 | 1.0 | 1.0 | 1.0 | 0.5 | 0.7 | 1.4 | 1.7 | 1.8 | 1.9 |
|---|---|---|---|---|---|---|---|---|---|---|---|
| $T_{co}$ (nm) | 0.2 | 0.3 | 1.0 | 1.4 | 1.7 | 0.7 | 0.7 | 0.7 | 0.7 | 0.7 | 0.7 |
| CN ratio (dB) | 44.3 | 49.1 | 50.2 | 47.3 | 40.4 | 40.2 | 48.6 | 51.1 | 47.4 | 47.2 | 39.2 |

EXAMPLE 5

While in Examples 1 to 4 the first magnetic layer was formed by sputtering without application of a substrate bias voltage, in this Example a magneto-optical recording medium was constructed with the first magnetic layer formed by sputtering with application of a substrate bias voltage. The film formation method for other magnetic films was not changed. The application of a substrate bias voltage was achieved by connecting a rf source with an electrode of the substrate and supplying a rf power of 200 W to the substrate during the formation of the first magnetic layer. Table 7 shows respective coercive forces Hca at room temperature of different types of the first magnetic layer formed without application of a substrate bias voltage and those Hcb in the case with application of a substrate bias voltage.

TABLE 7

| First magnetic layer | Hca | Hcb |
|---|---|---|
| $Gd_{0.19}Fe_{0.69}Co_{0.12}$ | 280 Oe | 120 Oe |
| $(Gd_{0.90}Nd_{0.10})_{0.20}(Fe_{0.85}Co_{0.15})_{0.80}$ | 160 Oe | 90 Oe |
| Pt/Co (Pt unit layer thickness: 1.2 nm, Co unit layer thickness: 0.5 nm) | 720 Oe | 220 Oe |

In any of the cases shown in Table 7 the application of a substrate bias voltage reduced the coercive force of the first magnetic layer. Since an external magnetic field for the superresolutive reproduction needs to be larger than the inversed magnetic field of the first magnetic layer at the operation temperature, the smaller coercive force of the first magnetic layer, the more the external magnetic field can be reduced. Thus, in the magneto-optical recording medium of the present invention an effect of reducing an external magnetic field can be performed by forming the first magnetic layer by sputtering with application of a substrate bias voltage.

It should be noted that in Examples 1 to 5 an intermediate layer such as a thin magnetic layer may be interposed between any two adjacent layers of the six magnetic layers so as to control the exchange force working thereat to an appropriate value.

EXAMPLE 6

In any of Examples 1 to 5 the direction of an external magnetic field for recording was the same as that of an external magnetic field for reproduction. The magneto-optical recording medium of the constitution noted in the first part of Example 1 was measured for its CN ratio in reproduction with a varying reproduction light beam intensity in a condition (a) where the direction of an external magnetic field for recording was the same as that of an external magnetic field for reproduction or in a condition (b) where the respective directions of such external magnetic fields were opposite to each other. Table 8 shows the results of the measurement. The magnitude of the external magnetic field was 300 Oe.

TABLE 8

| Reproduction light beam intensity (mW) | | 0.8 | 1.0 | 1.2 | 1.4 | 1.8 | 2.0 | 2.2 | 2.4 |
|---|---|---|---|---|---|---|---|---|---|
| CN ratio (dB) | (a) | 48.2 | 49.6 | 50.2 | 50.8 | 51.0 | 51.2 | 51.2 | 18.1 |
| | (b) | 46.3 | 47.2 | 49.5 | 50.3 | 22.7 | 22.1 | 21.2 | 19.8 |

In the condition (a), the CN ratio dropped steeply when the reproduction light beam intensity exceeded 2.2 mW. This is conceivably because with a large reproduction light beam intensity the low-temperature operation of the direct overwriting operation occurred even in the reproduction operation thereby erasing recorded information. In the condition (b), on the other hand, the CN ratio dropped steeply when the reproduction light beam intensity exceeded 1.4 mW. This indicates that reproduction light beam having an intensity lower than the intensity at which the low-temperature operation occurs confuses recorded information, and which is based on the fact that part of the recorded information was erased since the direction of a magnetic field for reproduction was opposite to that of a magnetic field for recording. That is, if there is applied an external magnetic field for reproduction of the same direction with that for recording, good reproduction characteristics can be obtained in response to reproduction light beam of a wide intensity range. In addition thereto, as means for producing an external magnetic field a stationary magnet can be used instead of an electromagnet, thereby offering secondary effects such as a simplified device configuration and reduced costs for production.

As has been described, according to the present invention there can be provided a magneto-optical recording medium which allows both the superresolutive reproduction operation and the direct overwriting operation while offering favorable reproduction characteristics.

Though several embodiments of the present invention are described above, it is to be understood that the present invention is not limited only to the above-mentioned, various changes and modifications may be made in the invention without departing from the spirit and scope thereof.

What is claimed is:

1. A recording/reproduction method for recording or reproducing information using the magneto-optical recording medium, said magneto-optical recording medium comprising a first magnetic layer comprising a rare earth-transition metal alloy or a ferromagnetic material containing a magnetic transition metal, a second magnetic layer comprising a rare earth-transition metal alloy, a third magnetic layer comprising a rare earth-transition metal alloy, a fourth magnetic layer comprising a rare earth-transition metal alloy, a fifth magnetic layer comprising a rare earth-transition metal alloy, and a sixth magnetic layer comprising a rare earth-transition metal alloy, said second to sixth magnetic layers being stacked in this order on said first magnetic layer, adjacent layers of said second to sixth magnetic layers being coupled by an exchange force thereof, wherein said first magnetic layer as a Curie temperature higher than that of said second magnetic layer; said third magnetic layer has a Curie temperature higher than that of said second magnetic layer; said fourth magnetic layer has a Curie temperature higher than that of said third magnetic layer; said sixth magnetic layer has a Curie temperature higher than that of said third magnetic layer; said fourth magnetic layer has a Curie temperature higher than that of said fifth magnetic layer; said fifth magnetic layer has a Curie temperature higher than or equal to that of said second magnetic layer, said sixth magnetic layer has a Curie temperature higher than that of said fifth magnetic layer, and wherein magnetization of said third magnetic layer is not inverted by an inversion of magnetization of said fourth magnetic layer at room temperature; a transition metal sub-lattice magnetization direction of said first magnetic layer and a transition metal sub-lattice magnetization direction of said second magnetic layer are aligned in an upward direction within a region where a transition metal sub-lattice magnetization direction of said third magnetic layer is aligned in the upward direction, while aligned in a downward direction within a region where the transition metal sub-lattice magnetization direction of said third magnetic layer is aligned in the downward direction, and respective transition sub-lattice magnetization directions of said fourth, fifth and sixth magnetic layers are aligned in either the upward or downward direction at room temperature, said method comprising applying external magnetic fields of the same direction for recording information and reproducing information, respectively.

2. A recording/reproduction method of claim 1, wherein said first magnetic layer comprises a rare earth-transition metal alloy in which the transition metal sub-lattice magnetization thereof is predominant, and said fourth magnetic layer comprises a rare earth-transition metal alloy having a compensation temperature between room temperature and the Curie temperature thereof.

3. A recording/reproduction method of claim 1, wherein said first magnetic layer comprises a ferromagnetic material containing a magnetic transition metal, and said fourth magnetic layer comprises a rare earth-transition metal alloy having a compensation temperature between room temperature and the Curie temperature thereof.

4. The magneto-optical recording medium of claim 1, wherein said second magnetic layer is composed of a rare earth-transition metal alloy containing Ho, represented by the general formula (I):

$$(RE1_{1-x}Ho_x)_y(Fe_{1-z}Co_z)_{1-y} \qquad (I)$$

wherein RE1 is a rare earth metal other than Ho, $1 \geq x \geq 0.02$, $0.05 \leq y \leq 0.2$, and $0 \leq z \leq 1$.

5. A recording/reproduction method of claim 1, wherein said first magnetic layer comprises a rare earth-transition metal alloy containing Nd, represented by the general formula (II):

$$(RE2_{1-u}Nd_u)_v(Fe_{1-w}Co_w)_{1-v} \qquad (II)$$

where RE2 is a rare earth metal other than Nd, $1 \geq u \geq 0.1$, $0.05 \leq v \leq 0.2$, and $0 \leq w \leq 1$.

6. A recording/reproduction method of claim 1, wherein said first magnetic layer comprises a multilayered film of said ferromagnetic material in which a platinum layer and a cobalt layer, or a palladium layer and a cobalt layer are alternately stacked, and wherein the thickness of the platinum layer or palladium layer is within the range of 0.7 to 1.8 nm, while the thickness of the cobalt layer is within the range of 0.3 to 1.4 nm.

7. A recording/reproduction method of claim 1, wherein said first magnetic layer is formed by a substrate bias sputtering process.

* * * * *